(12) United States Patent
Iida (10) Patent No.: US 11,750,748 B2
(45) Date of Patent: Sep. 5, 2023

(54) IMAGE PROCESSING APPARATUS, METHOD, AND STORAGE MEDIUM TO EVALUATE PRINTED MATERIAL WITH DECREASED INFLUENCE OF SPECIFIC CHARACTERISTIC OF PRINT MEDIUM DETERMINED FROM MARGIN AREA OF PRINTED CHART

(71) Applicant: CANON KABUSHIKI KAISHA, Tokyo (JP)

(72) Inventor: Yoshiko Iida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/885,649

(22) Filed: Aug. 11, 2022

(65) Prior Publication Data
US 2023/0099873 A1    Mar. 30, 2023

(30) Foreign Application Priority Data
Sep. 17, 2021  (JP) ................................ 2021-152044

(51) Int. Cl.
*H04N 1/00* (2006.01)
(52) U.S. Cl.
CPC ..... *H04N 1/00045* (2013.01); *H04N 1/00015* (2013.01); *H04N 1/00039* (2013.01); *H04N 1/00068* (2013.01); *H04N 1/00076* (2013.01); *H04N 1/00087* (2013.01); *H04N 1/00092* (2013.01); *H04N 1/00816* (2013.01)

(58) Field of Classification Search
CPC .......... H04N 1/00015; H04N 1/00039; H04N 1/00045; H04N 1/00068; H04N 1/00076; H04N 1/00087; H04N 1/00092; H04N 1/00816
See application file for complete search history.

(56) References Cited

U.S. PATENT DOCUMENTS

| 7,869,091 | B2 * | 1/2011 | Andersen | ........... H04N 1/00031 |
| | | | | 358/1.9 |
| 10,931,844 | B2 * | 2/2021 | Aoyagi | .............. H04N 1/00748 |
| 11,582,367 | B2 * | 2/2023 | Oba | .................... H04N 1/00708 |
| 2012/0236344 | A1 * | 9/2012 | Nagase | .............. H04N 1/00013 |
| | | | | 358/1.13 |
| 2020/0016907 | A1 * | 1/2020 | Ogushi | .............. H04N 1/00034 |

FOREIGN PATENT DOCUMENTS

JP         2004-064687  4         2/2004

* cited by examiner

*Primary Examiner* — Scott A Rogers
(74) *Attorney, Agent, or Firm* — Venable LLP (57) ABSTRACT

An image processing apparatus extracts an image area corresponding to a margin area of a chart for evaluation from a scanned image obtained by scanning a printed material on which the chart is printed. The image processing apparatus evaluates the printed material based on, in a case when a printing medium used for the printing is determined to be a printing medium having a specific characteristic based on the image area corresponding to the margin area, the scanned image from which influence based on the specific characteristic is decreased.

13 Claims, 11 Drawing Sheets

Sheet Registration — 901

| ID — 902 | Sheet texture pattern image — 903 | Evaluation item — 904 | Texture removal — 905 |
|---|---|---|---|
| thick glossy paper A-300 | *_000.tif<br>*_090.tif<br>*_180.tif<br>*_270.tif | granularity | specific frequency removal |
| | | line | pixel brightness filter |
| | | streak heterogeneity | no processing |
| | | ... | ... |

Edit — 906  Register — 907

IMAGE PROCESSING APPARATUS, METHOD, AND STORAGE MEDIUM TO EVALUATE PRINTED MATERIAL WITH DECREASED INFLUENCE OF SPECIFIC CHARACTERISTIC OF PRINT MEDIUM DETERMINED FROM MARGIN AREA OF PRINTED CHART

CROSS-REFERENCE TO RELATED APPLICATION

This application claims the benefit of Japanese Patent Application No. 2021-152044, filed Sep. 17, 2021, which is hereby incorporated by reference herein in its entirety.

BACKGROUND OF THE INVENTION

Field of the Invention

The present disclosure relates to a technique to evaluate the image quality of a printed material.

Description of the Related Art

As a technique to evaluate the image quality of a printed material, Japanese Patent Laid-Open No. 2004-64687 has disclosed a technique to evaluate image quality by reading and analyzing a halftone image printed on a printing medium by a printing apparatus and using results of removing halftone dot frequency components from the analysis results.

SUMMARY

Incidentally, there are a variety of types of printing media and different types of printing media have different characteristics. For example, in a case of a printing medium called silky tone glossy paper, there is a characteristic that a periodic pattern appears as texture due to three-dimensional concavities and convexities on the surface. In a scanned image obtained by reading an image printed on the silky tone glossy paper, the shading of concavities and convexities caused by irradiation of a light source at the time of reading appears as a periodic pattern. Here, in a case when the image quality of a printed material using the silky tone glossy paper is evaluated, with the technique of Japanese Patent Laid-Open No. 2004-64687 described above, it is not possible to distinguish between the periodic pattern caused by printing and the periodic pattern due to the above-described characteristic of the printing medium itself, and, therefore, it is not possible to appropriately evaluate the image quality of the printed material. Further, the problem such as this does not necessarily occur for the silky tone glossy paper alone and there is a possibility that the same problem occurs for another type of printing medium depending on the characteristic thereof.

The present disclosure provides a technique to appropriately evaluate a printed material in accordance with the type of printing medium used for printing.

An image processing apparatus according to one aspect of the present disclosure for solving the above-described problem is an image processing apparatus for evaluating a printed material and including an extraction unit configured to extract an image area corresponding to a margin area of a chart for the evaluation from a scanned image obtained by scanning a printed material on which the chart is printed and an evaluation unit configured to evaluate the printed material based on, in a case when a printing medium used for the printing is determined to be a printing medium having a specific characteristic based on the image area corresponding to the margin area, the scanned image from which influence based on the specific characteristic is decreased.

Further features of the present disclosure will become apparent from the following description of exemplary embodiments with reference to the attached drawings.

DESCRIPTION OF THE EMBODIMENTS

First, the characteristic of a printing medium (sheet) is explained. As the printing medium, in addition to plain paper whose material is pulp, there is a sheet called synthetic paper whose material is synthetic resin. Then, some synthetic paper has the characteristic that a periodic pattern appears as texture due to three-dimensional concavities and convexities on the surface, for example, such as glossy paper, half-glossy paper, and mat paper.

In processing to evaluate the image quality of a printed material in which an image is printed on a printing medium, a scanned image obtained by scanning the printed material is analyzed and an evaluation value is calculated for each image quality evaluation item, such as granularity, streak heterogeneity, sharpness, and color reproducibility.

Some printing media have texture in a plain state depending on the type. Further, in a scanned image obtained by scanning a printing medium having texture, the shading of concavities and convexities that occurs due to irradiation of a light source at the time of scan appears as a periodic pattern, and, therefore, there is a case when a periodic pattern due to the texture is included.

Figure 11A:
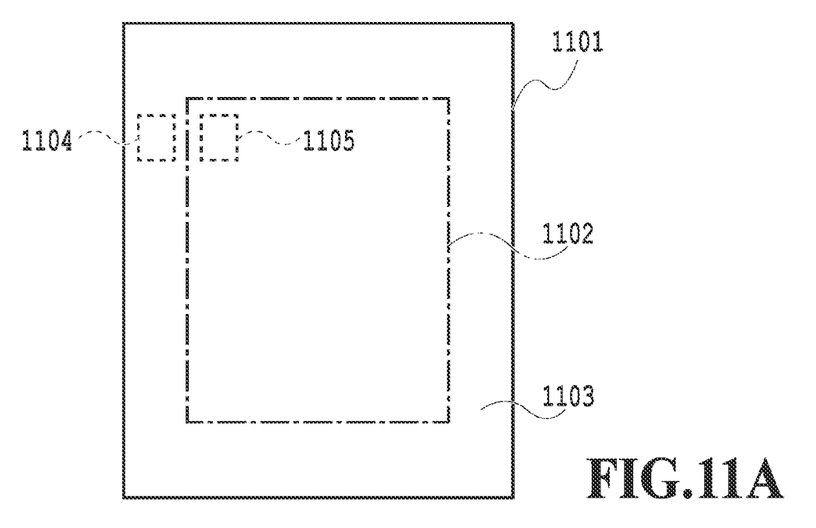
FIG. 11A to FIG. 11C are each a diagram showing a scanned image example.
Figure 11B:
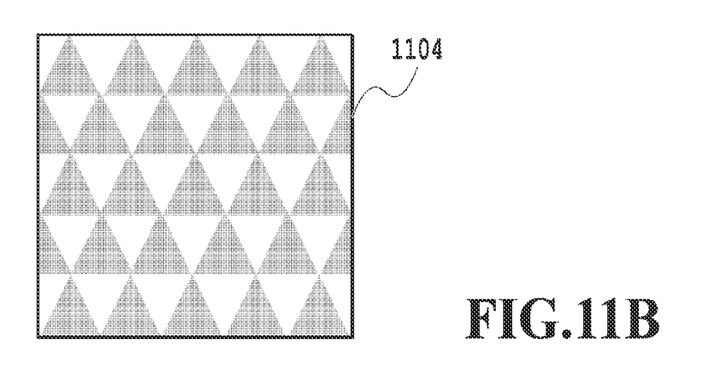
Figure 11C:
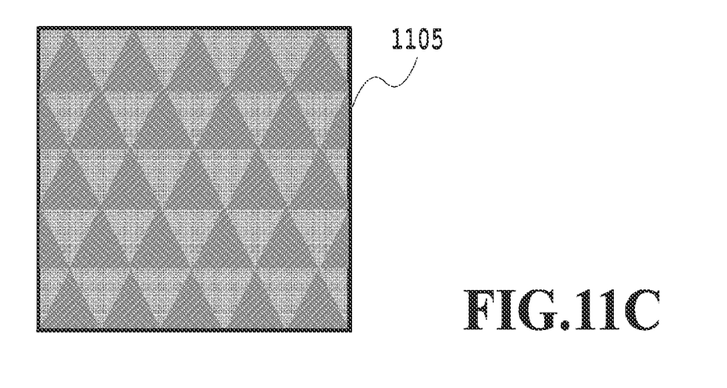

FIG. 11A to FIG. 11C are each a diagram showing a scanned image example of a printed material in which a test chart is printed on a printing medium having a twill weave texture. FIG. 11A is a diagram showing the entire scanned image. FIG. 11B is a diagram showing part of a white paper area (margin area) that is a non-printed area in which the test chart is not printed in the scanned image in FIG. 11A. FIG. 11C is a diagram showing part of the test chart area that is the printed area in which the test chart is printed in the scanned image in FIG. 11A. The test chart area does not include the margin area, and, therefore, can also be called the area other than the margin area.

A scanned image 1101 is a scanned image of a printed material in which a test chart is printed on a printing medium having a twill weave texture. As shown in FIG. 11A, the scanned image 1101 has a printed area (test chart area) 1102 in which the test chart is printed and a non-printed area (white paper area) 1103 in which the test chart is not printed.

A scanned image 1104 of the non-printed area 1103 includes the triangular shading caused by the scan as shown in FIG. 11B although the surface of the printing medium is plain. A scanned image 1105 of the printed area 1102 includes the triangular shading caused by the scan as shown in FIG. 11C as in the non-printed area 1103.

As regards the evaluation value of the printing medium having the texture such as this, whether the evaluation value in the state where the shading by the texture is included is employed or the evaluation value in the state where the shading by the texture is not included is employed, is different depending on a user who observes the printed material or the observation environment.

In the present embodiment, an image processing apparatus is explained that analyzes the pattern of texture of a printing medium, selects evaluation processing in accordance with a sheet texture pattern that occurs on the printed surface of a printed material, and evaluates the image quality of the printed material by using the selected evaluation processing.

In the following, embodiments of the present disclosure are explained with reference to the drawings. The following embodiments are not intended to limit the present disclosure and all combinations of features explained in the present embodiments are not necessarily indispensable to the solution of the present disclosure. Explanation is given by attaching the same symbol to the same configuration.

First Embodiment

Figure 1:
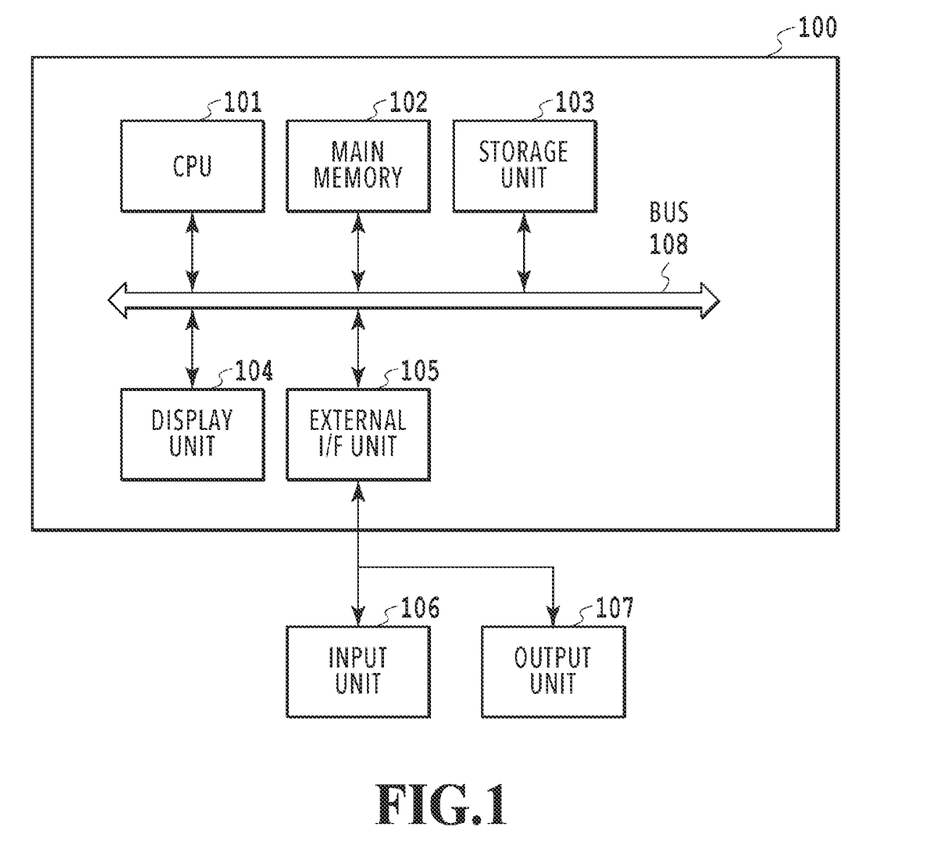
FIG. 1 is a block diagram showing a hardware configuration example of an image processing apparatus.

FIG. 1 is a diagram showing a hardware configuration example of an image processing apparatus according to the present embodiment. As shown in FIG. 1, an image processing apparatus 100 comprises a CPU 101, a main memory 102, a storage unit 103, a display unit 104, and an external I/F 105, and each unit is connected to one another via a bus 108.

First, the CPU 101 is a central processing unit configured to comprehensively control the image processing apparatus 100 and performs various types of processing by executing various programs stored in the storage unit 103, and the like. The main memory 102 provides a work area to the CPU 101 as well as temporarily storing data, parameters, and the like, which are used in the various types of processing. The storage unit 103 is a large-capacity storage device that stores various programs and various types of data necessary for displaying a GUI (Graphical User Interface) and, for example, a nonvolatile memory, such as a hard disk and a silicon disk, is used. The display unit 104 includes a liquid crystal panel, and the like, and displays a GUI for a user operation or a warning. The external I/F unit 105 connects an input unit 106, such as a scanner, a camera, a keyboard, a mouse, an electronic pen, and a touch panel, and an output unit 107, such as a printing apparatus, to the bus 108, and performs transmission and reception of image data and control signal data.

As the configuration of the image processing apparatus 100, various components exist other than those described above, but they are not the main purpose of the present disclosure, and, therefore, explanation thereof is omitted.

In the present embodiment, an image quality evaluation apparatus of a printed material is explained, in which the output unit 107 is taken as a printing apparatus and the input unit 106 to which an image is input, is taken as a scanner.

Figure 2:
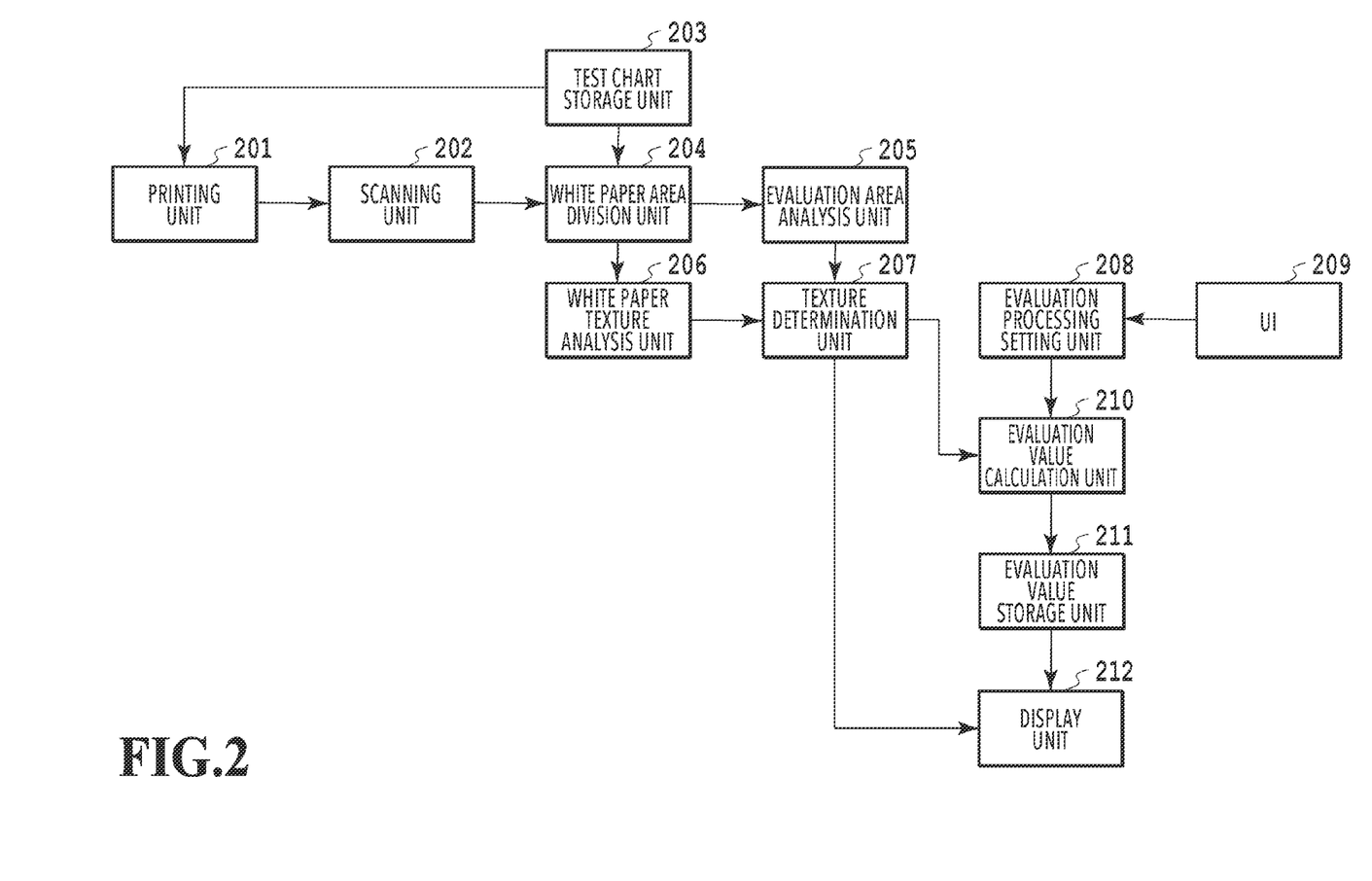
FIG. 2 is a block diagram showing a function configuration example of the image processing apparatus.

FIG. 2 is a block diagram showing a function configuration example of the image processing apparatus, as the image quality evaluation apparatus of a printed material. By the function units of the image processing apparatus shown in FIG. 2, the processing from printing up to image evaluation is performed. It is assumed that the evaluation method and the condition of a printed material in accordance with the presence/absence of a sheet texture pattern are set in advance by a user via a UI 209 and stored in an evaluation processing setting unit 208.

A printing unit 201 obtains test chart image data for printing, which is stored in a test chart storage unit 203 within the image quality evaluation apparatus, and outputs a printed material obtained by printing a test chart on a printing medium based on the obtained test chart image data. A scanning unit 202 obtains scanned image data of the test chart by scanning the printed material output by the printing unit 201 and delivers the obtained scanned image data to a white paper area division unit 204. The white paper area division unit 204 divides the scanned image data received from the scanning unit 202 into data of the white paper area, which is a non-printed area, in which the test chart is not printed, and data of the test chart area, which is a printed area, in which the test chart is printed. That is, it can also be said that the scanned image data is divided into the data of the image area corresponding to the margin area of the chart and the data of the image area corresponding to the chart. The data of the white paper area is compared with the data of the evaluation area in a texture determination unit 207, whose details will be described later, and, therefore, the data of the white paper area can also be said as the data of the comparison area. Then, the white paper area division unit 204 delivers the data of the test chart area to an evaluation area analysis unit 205 and delivers the data of the white paper area to a white paper texture analysis unit 206. For the above-described division, a publicly known technique is used, for example, such as processing based on markers of a printed material indicating the printed area, data about the markers being attached to the test chart image data, and processing based on information that is set in the printing unit 201 and that indicates the printed area and the non-printed area. Further, it may also be possible to use processing to divide into data of the white paper area (margin area) between adjacent patch areas of a plurality of patch areas constituting the test chart and data other than the white paper area (margin area) based on the test chart image data.

The evaluation area analysis unit 205 performs analysis processing, for example, such as frequency analysis, for the data of the test chart area (evaluation area) received from the white paper area division unit 204. The white paper texture analysis unit 206 performs analysis processing, for example, such as frequency analysis, for the data of the white paper area received from the white paper area division unit 204. Details of the analysis processing will be described later. The analysis results obtained by the evaluation area analysis unit 205 are delivered to the texture determination unit 207. The analysis results obtained by the white paper texture analysis unit 206 are delivered to the texture determination unit 207.

The texture determination unit 207 performs processing to determine the presence/absence of a texture pattern based on the frequency analysis processing results of the scanned image, which are obtained by the evaluation area analysis unit 205, and the frequency analysis processing results of the scanned image, which are obtained by the white paper texture analysis unit 206. By performing the determination processing of a texture pattern, whether there is a sheet texture pattern in the scanned image of the white paper area is determined. That is, it can also be said that the characteristic of the printing medium used for printing is determined. The determination results of the presence/absence of a sheet texture pattern are delivered to an evaluation value calculation unit 210 and a display unit 212.

The evaluation processing setting unit 208 refers to the evaluation method and the condition of a printed material, which are set in accordance with the determination results of a sheet texture pattern. Then, the evaluation processing setting unit 208 selects white paper texture pattern removal processing for the test chart area of the scanned image by the evaluation area analysis unit 205 based on the evaluation method and the condition of the printed material, which are referred to, and determines the evaluation method. The information relating to the determined evaluation method is delivered to the evaluation value calculation unit 210.

The UI 209 displays a user interface (UI) screen for setting the evaluation method and the condition of a printed material, and receives the setting of the evaluation method and the condition of a printed material by a user operation. The information relating to the received setting of the evaluation method and the condition of the printed material is delivered to the evaluation processing setting unit 208 described above.

The evaluation value calculation unit 210 calculates an evaluation value by using the evaluation method determined by the evaluation processing setting unit 208 and delivers the calculated evaluation value to an evaluation value storage unit 211. The evaluation value storage unit 211 stores the evaluation value received from the evaluation value calculation unit 210. The display unit 212 displays various UI screens, evaluation results, error messages, and the like.

Figure 3:
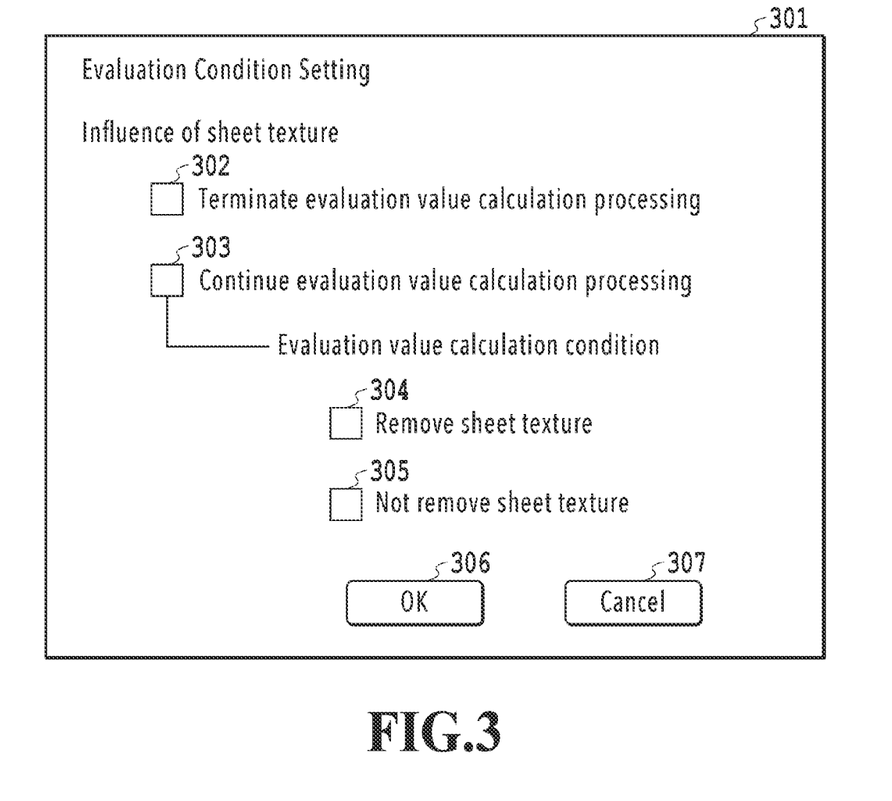
FIG. 3 is a diagram showing a user interface (UI) screen example.

FIG. 3 is a diagram showing a UI screen example on which to set the evaluation method (condition) to the evaluation processing setting unit 208. As shown in FIG. 3, a UI screen 301 is a UI screen for setting the evaluation method (condition). As regards the influence of sheet texture, the UI screen 301 has a checkbox 302 for setting "Terminate evaluation value calculation processing" and a checkbox 303 for setting "Continue evaluation value calculation processing". Further, as regards the evaluation value calculation condition, the UI screen 301 further has a checkbox 304 for setting "Remove sheet texture" and a checkbox 305 for setting "Not remove sheet texture". The UI screen has an "OK" button 306 and a "Cancel" button 307.

The checkbox 302 is a component for selecting terminating the evaluation value calculation processing in a case when there is an influence of sheet texture pattern in the evaluation of an image in the present embodiment. The checkbox 303 is a component for selecting continuing the evaluation value calculation processing even in a case when there is an influence of a sheet texture pattern in the evaluation of an image in the present embodiment.

In a case when the checkbox 303 is selected, it is possible to select the checkbox 304 or the checkbox 305. The check box 304 is a component for selecting performing processing to remove the sheet texture pattern in the test chart area (printed area). On the other hand, the check box 305 is a component for selecting not performing processing to remove the sheet texture pattern in the test chart area (printed area).

The "OK" button 306 is a button for setting the above-described selected condition. The "Cancel" button 307 is a button for cancelling the above-described selected condition. It is assumed that, in a case when there is no influence of sheet texture, "Continue evaluation value calculation processing" is set.

Figure 4A:
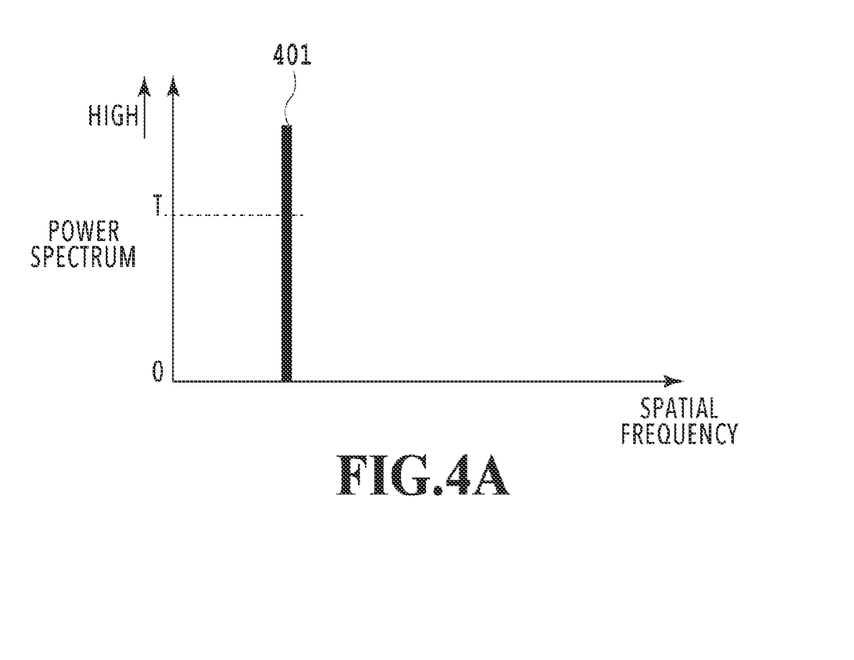
FIG. 4A and FIG. 4B are each a diagram showing frequency analysis results of a scanned image.
Figure 4B:
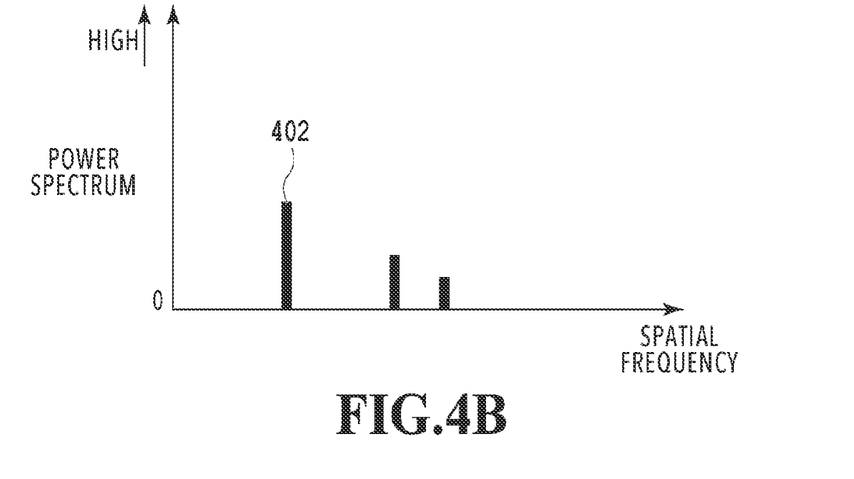

An example of sheet texture determination and sheet texture pattern removal processing is explained by using the drawings. FIG. 4A and FIG. 4B are each a diagram showing scanned image frequency analysis results. FIG. 4A is a graph showing a power spectrum obtained by performing frequency analysis for the image, which is the scanned image of the sheet white paper area (margin area) converted into a brightness image. FIG. 4B is a graph showing a power spectrum obtained by performing frequency analysis for the image, which is the scanned image of the test chart area converted into a brightness image.

In a case when there is a three-dimensional texture pattern on a sheet, as shown in FIG. 4A, a power spectrum 401 greater than a threshold value (specified level) T, which is a prescribed value determined in advance, is confirmed at a specific frequency (spatial frequency). In the test chart area of the scanned image, as shown in FIG. 4B, it is confirmed that there is a power spectrum 402 at the same frequency as the frequency (frequency of the sheet texture pattern) of the power spectrum 401.

Consequently, in a case when it is detected that the value within a prescribed frequency range is larger than or equal to the above-described threshold value T by the power spectrum in FIG. 4A in the sheet texture determination, it is possible to determine that there is a three-dimensional texture. Further, in the processing to calculate the evaluation value of an image by using the power spectrum, it is possible to decrease the influence of sheet texture by using the power spectrum shown next. That is, by using the power spectrum obtained by removing the power spectrum 402 at the frequency of the sheet texture pattern from the power spectrum of the test chart area in FIG. 4B, it is possible to decrease the influence of sheet texture.

(Image Evaluation Processing)

Figure 5:
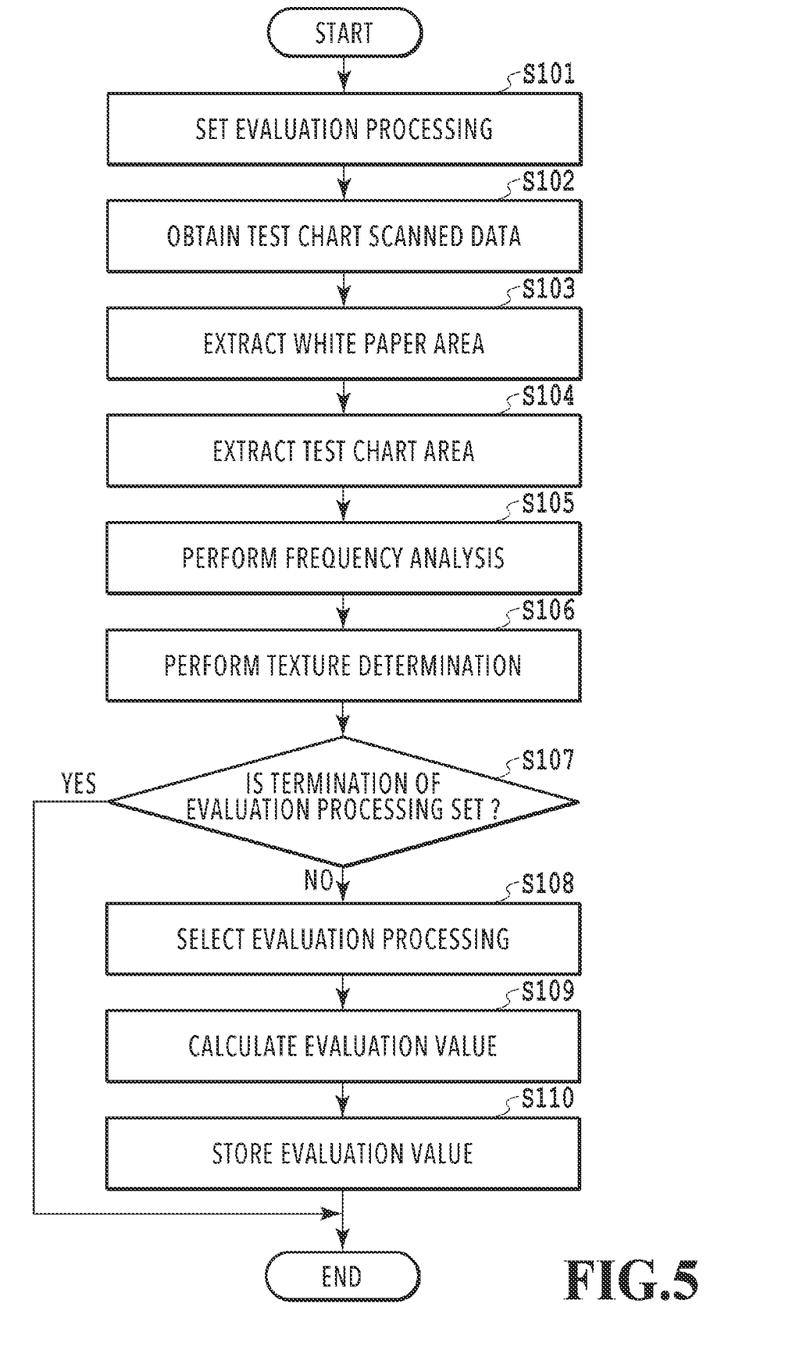
FIG. 5 is a flowchart showing a flow of image evaluation processing.

FIG. 5 is a flowchart showing a flow of image evaluation processing according to the present embodiment. The series of processing shown in the flowchart in FIG. 5 is performed by the CPU 101 loading a program code stored in the storage unit 103 onto the main memory 102 and executing the program code. Further, it may also be possible to implement part or all of the functions at steps in FIG. 5 by hardware, such as an ASIC and an electronic circuit. Symbol "S" in explanation of each piece of processing means that the step is a step in the flowchart and this also applies to subsequent flowcharts.

At S101, the evaluation processing setting unit 208 sets the evaluation method that is selected, for example, on the UI screen 301 shown in FIG. 3. That is, in a case when there is an influence of sheet texture, the evaluation method of "Terminate evaluation value calculation processing" or "Continue evaluation value calculation processing" is set and in a case when there is no influence of sheet texture, the evaluation method of "Continue evaluation value calculation processing" is set.

At S102, the scanning unit 202 scans a printed material, which is a sheet on which the test chart is printed, and obtains the scanned image of the printed material. The obtained scanned image is sent to the white paper area division unit 204.

At S103, the white paper area division unit 204 extracts (divides) the sheet white paper area (non-printed area) from the scanned image obtained at S102. The scanned image of the extracted white paper area (non-printed area) is sent to the white paper texture analysis unit 206.

At S104, the white paper area division unit 204 extracts (divides) the test chart area (printed area) from the scanned image obtained at S102. The scanned image of the extracted test chart area (printed area) is sent to the evaluation area analysis unit 205.

At S105, the white paper texture analysis unit 206 performs frequency analysis for the scanned image of the white paper area (non-printed area). The frequency analysis results are sent to the texture determination unit 207. The evaluation area analysis unit 205 performs frequency analysis for the scanned image of the test chart area (printed area). The frequency analysis results are sent to the texture determination unit 207.

At S106, the texture determination unit 207 determines whether there is a sheet texture pattern by using the frequency analysis results by the white paper texture analysis unit 206 and the frequency analysis results by the evaluation area analysis unit 205. That is, it can also be said that the determination is to determine the characteristic of the printing medium used for printing based on the image area corresponding to the margin area. The sheet texture determination results are sent to the evaluation value calculation unit 210.

At S107, the evaluation processing setting unit 208 determines whether or not the termination of the evaluation processing is set by referring to the evaluation method (evaluation method obtained at S101) that is set to the sheet texture determination results. In a case when the determination results that the termination of the evaluation processing is set are obtained (YES at S107), the flow shown in FIG. 5 is terminated. In a case when the determination results that the termination of the evaluation processing is not set are obtained (NO at S107), the processing is moved to S108. That is, in a case when "Terminate evaluation value calculation processing" is set via the UI screen 301, the flow in FIG. 5 is terminated and, in a case when "Continue evaluation value calculation processing" is set, the processing is moved to S108.

At S108, the evaluation processing setting unit 208 selects the evaluation method that is set to the sheet texture determination results in a case where evaluation processing is performed. That is, the evaluation method of "Remove sheet texture" or "Not remove sheet texture", which is set via the UI screen 301, is selected.

At S109, the evaluation value calculation unit 210 calculates the evaluation value of an arbitrary image evaluation item by using the evaluation method that is selected at S108 for the test chart area of the scanned image. In a case when the evaluation method "Remove sheet texture" is selected, it can also be said that the image quality of a printed material is evaluated based on the scanned image from which the influence based on the specific characteristic is decreased. The calculated evaluation value is sent to the evaluation value storage unit 211.

At S110, the evaluation value storage unit 211 stores the evaluation value calculated at S109. The stored evaluation value is referred to at the time of the evaluation value being displayed on the display unit 212.

By the above, the processing of the flowchart shown in FIG. 5 is completed.

In the present embodiment, the aspect is explained in which whether performing the sheet texture pattern removal processing is selected in a case when an arbitrary image evaluation item is evaluated, but this is not limited. For example, it may also be possible to set whether to perform the sheet texture pattern removal processing for each image evaluation item. Further, it may also be possible to use different sheet texture pattern removal methods for different image evaluation items.

Figure 6:
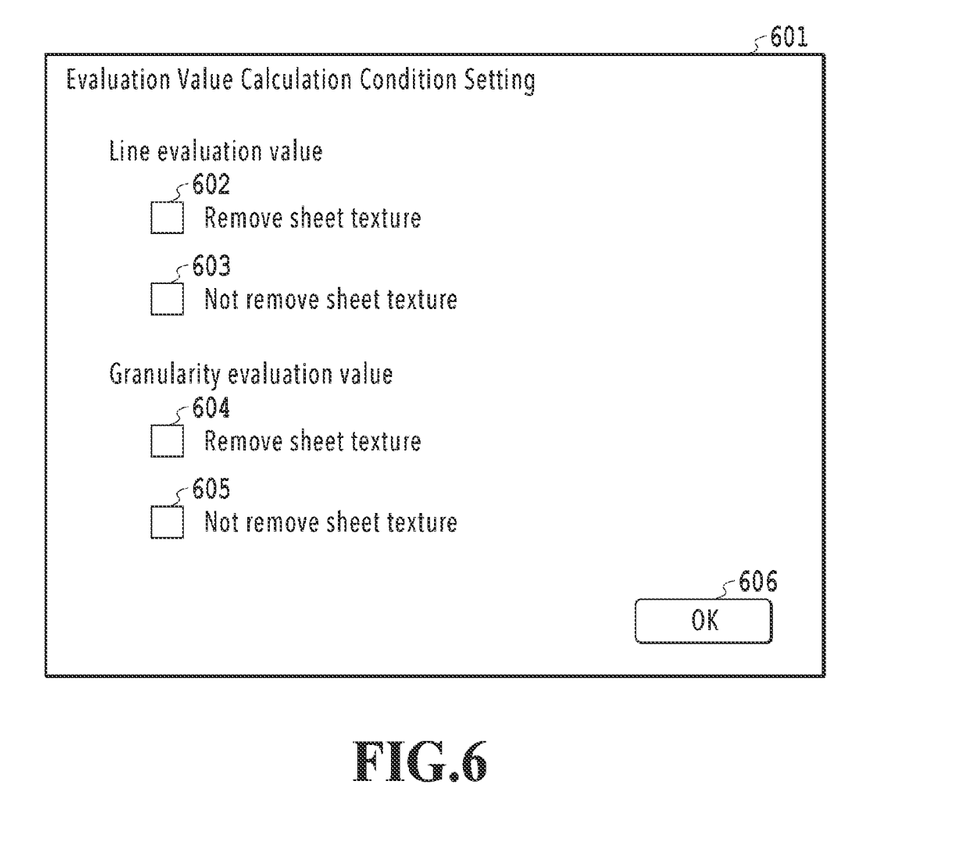
FIG. 6 is a diagram showing a UI screen example.

FIG. 6 is a diagram showing a UI screen example on which to set the sheet texture pattern removal method for each evaluation item. A UI screen 601 is, as shown in FIG. 6, a UI screen for setting an evaluation value calculation condition. As regards the line evaluation value, the UI screen 601 has a checkbox 602 for setting "Remove sheet texture" and a checkbox 603 for setting "Not remove sheet texture". As regards the granularity evaluation value, the UI screen 601 further has a checkbox 604 for setting "Remove sheet texture" and a checkbox 605 for setting "Not remove sheet texture". The UI screen has an "OK" button 606.

The checkbox 602 is a component for selecting performing processing to remove the sheet texture pattern in a case when the evaluation item in the test chart is the line evaluation. On the other hand, the checkbox 603 is a component for selecting not performing processing to remove the sheet texture pattern in a case when the evaluation item in the test chart is the line evaluation.

The checkbox 604 is a component for selecting performing processing to remove the sheet texture pattern in a case when the evaluation item in the test chart is the granularity evaluation. On the other hand, the checkbox 605 is a component for selecting not performing processing to remove the sheet texture pattern in a case when the evaluation item in the test chart is the granularity evaluation. The "OK" button 606 is a button for setting the above-described selected condition.

Further, it may also be possible to use different sheet texture pattern removal methods in the line evaluation and in the granularity evaluation. The sheet texture pattern removal method explained by using FIG. 4A and FIG. 4B is a method that is used in the granularity evaluation.

Figure 7A:
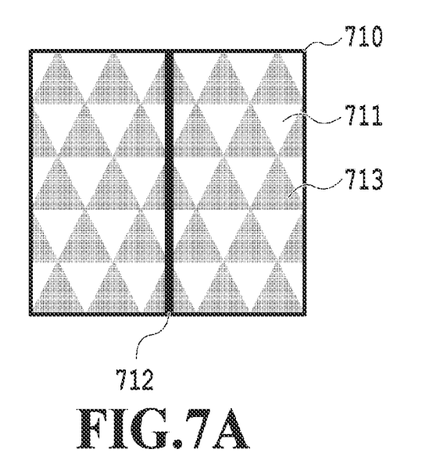
FIG. 7A to FIG. 7C are each a diagram explaining sheet pattern removal processing.
Figure 7B:
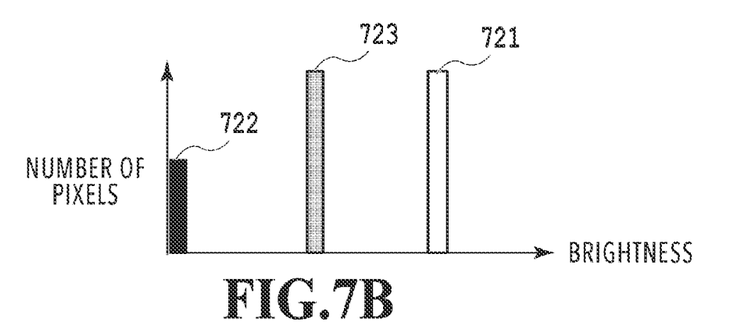
Figure 7C:
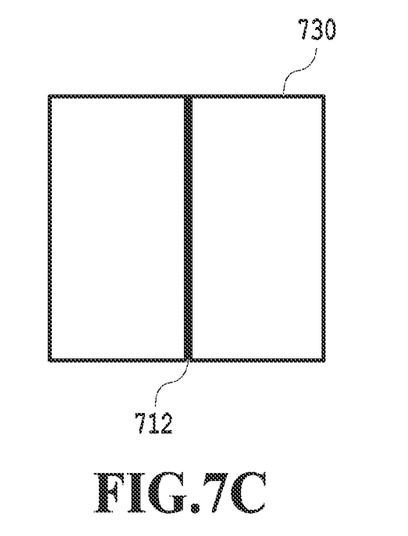

An example of the sheet texture pattern removal method in the line evaluation is explained by using the drawings. FIG. 7A to FIG. 7C are each a diagram explaining the sheet texture pattern removal method in the line evaluation. FIG. 7A is a diagram showing a scanned image example of the texture area. FIG. 7B is a diagram showing a pixel brightness histogram of a scanned image 710, which is analysis results of the scanned image shown in FIG. 7A. FIG. 7C is a diagram showing a scanned image example after texture pattern removal processing is performed for the scanned image in FIG. 7A.

As shown in FIG. 7A, the scanned image 710 is the image of the test chart area in the scanned image of the printed material on which the line evaluation test chart is printed. The scanned image 710 includes a plain area 711, a line 712 that is the evaluation target, and a sheet texture pattern 713. In the test chart area of the scanned image, as shown in FIG. 7B, there is a brightness distribution 723 of the sheet texture pattern 713, in addition to a brightness distribution 721 of the plain area 711 and a brightness distribution 722 of the line 712.

As shown in FIG. 7C, a scanned image 730 is an image (corrected image) after the texture pattern removal processing is performed for the scanned image 710. As the sheet texture pattern removal method in the line evaluation, for example, it may also be possible to use a method of replacing the pixel corresponding to the brightness distribution 723 of the sheet texture pattern 713 with the pixel corresponding to the sheet white color for the pixels of the scanned image 710.

The evaluation value calculation unit 210 obtains the evaluation item type of the test chart in the obtained scanned image. Then, the evaluation value calculation unit 210 selects the white paper texture pattern removal processing for the test chart area of the scanned image by the evaluation area analysis unit 205 by referring to the evaluation method and the condition of the printed material in the evaluation item, which is the target set to the evaluation processing setting unit 208, and calculates an evaluation value.

In the present embodiment, the power spectrum, which is found by performing frequency analysis for the sheet scanned image, is used for the texture determination, but this is not limited. It may also be possible to use another method capable of determining texture.

By performing the processing control explained above, it is possible to implement image quality evaluation of an image optimum for the characteristic of the sheet of a printed material and the purpose of observing the printed material. Specifically, it is possible to change the evaluation value calculation condition of a sheet with texture in accordance with the purpose of a printed material, and, therefore, it is possible to implement image quality evaluation of an image optimum for the characteristic of the sheet and the purpose of observing the printed material. That is, it is possible to appropriately evaluate the image quality of a printed material in accordance with the type of printing medium used for printing.

Second Embodiment

In the present embodiment, an aspect is explained, in which setting information in which the evaluation method corresponding to the sheet texture is stored in advance and by using a sheet texture pattern obtained by analyzing a scanned image, the corresponding evaluation method is set (selected) from the stored setting information.

Figure 8:
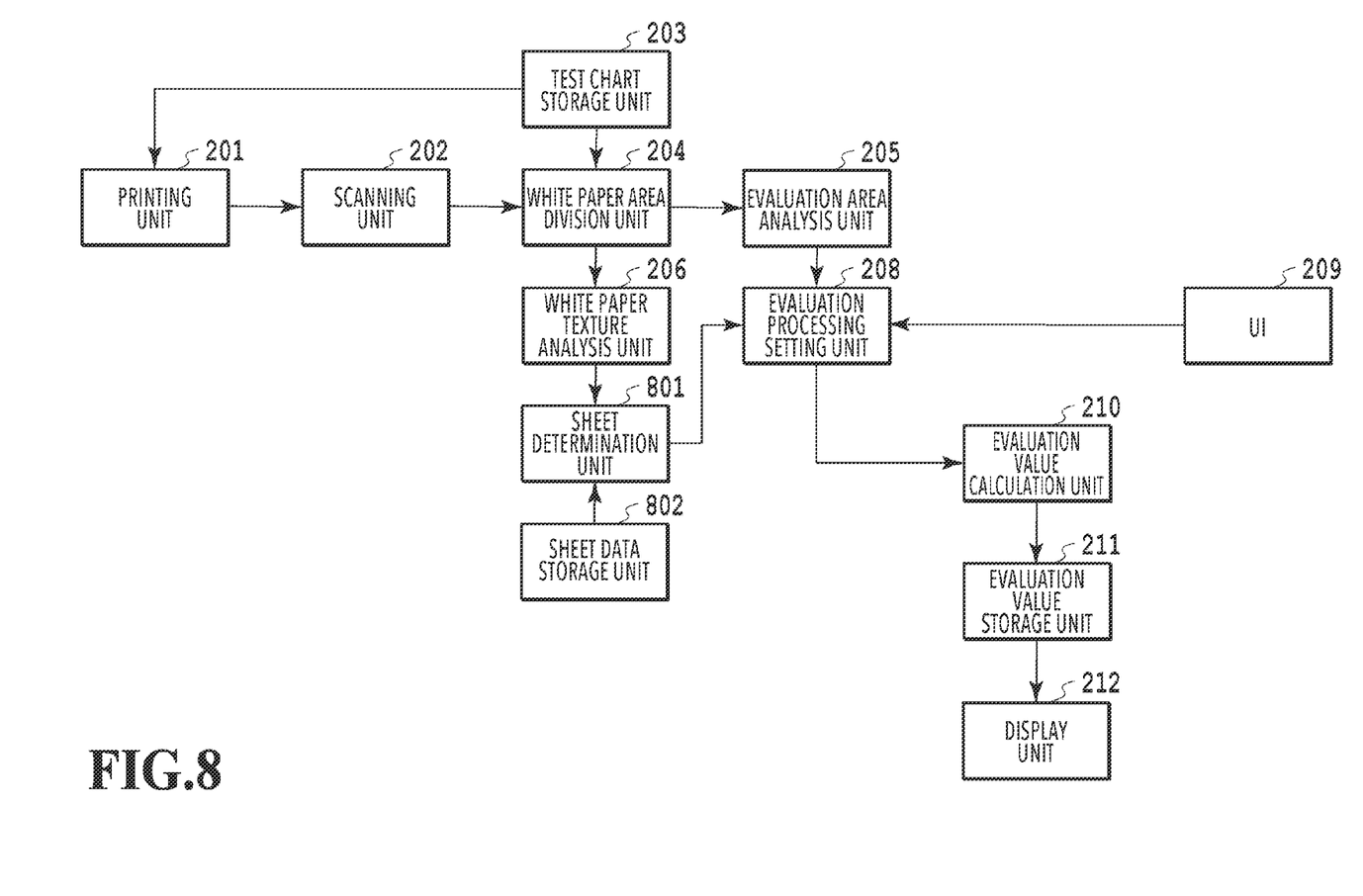
FIG. 8 is a block diagram showing a function configuration example of an image processing apparatus.

The configuration of the processing from printing to image evaluation in the present embodiment is explained by using the drawing. FIG. 8 is a block diagram showing a function configuration example of an image processing apparatus according to the present embodiment. The processing of the printing unit 201 to the white paper texture analysis unit 206 is the same as that of the first embodiment, and, therefore, explanation is omitted and points different from the first embodiment are explained mainly and briefly.

As shown in FIG. 8, the image processing apparatus according to the present embodiment further comprises a sheet determination unit 801 and a sheet data storage unit 802, in addition to the function units 201 to 206 and 208 to 212 comprised by the image processing apparatus of the above-described first embodiment.

The sheet determination unit 801 refers to results of a comparison between the image of a white paper area of a scanned image and the sheet scanned image (sheet texture pattern image) stored in the sheet data storage unit 802, whose details will be described later, and determines whether there is sheet data that matches with the scanned image. The sheet scanned image is an image of a printing medium having a prescribed characteristic, on which the test chart is not printed. Alternatively, the sheet determination unit 801 refers to results of frequency analysis of each sheet scanned image, and the like, and determines whether there is sheet data that matches with the scanned image. That is, it can also be said that the characteristic of the printing medium used for printing is determined. The obtained determination results are sent to the evaluation processing setting unit 208.

The evaluation processing setting unit 208 of the present embodiment performs the following processing in a case of obtaining the determination results that there is sheet data that matches with the scanned image from the sheet determination unit 801. That is, the evaluation processing setting unit 208 refers to the evaluation method and the condition of the printed material, which are stored in the sheet data storage unit 802, selects the white paper texture pattern removal processing for the test chart area of the scanned image by the evaluation area analysis unit 205, and determines the evaluation method. Then, the evaluation value calculation unit 210 calculates the evaluation value by using the evaluation method determined by the evaluation processing setting unit 208 and delivers the calculated evaluation value to the evaluation value storage unit 211. The evaluation value storage unit 211 stores the evaluation value received from the evaluation value calculation unit 210.

Further, the evaluation processing setting unit 208 of the present embodiment performs the following processing in a case of obtaining the determination results that there is no sheet data that matches with the scanned image from the sheet determination unit 801. That is, the evaluation processing setting unit 208 performs the same processing as that of the first embodiment.

The sheet data storage unit 802 stores sheet data associated with the scanned image of the white paper area (sheet texture pattern image) and the evaluation method for the sheet on the scanned image of which, a sheet texture exists and whose use frequency is high.

Figure 9:
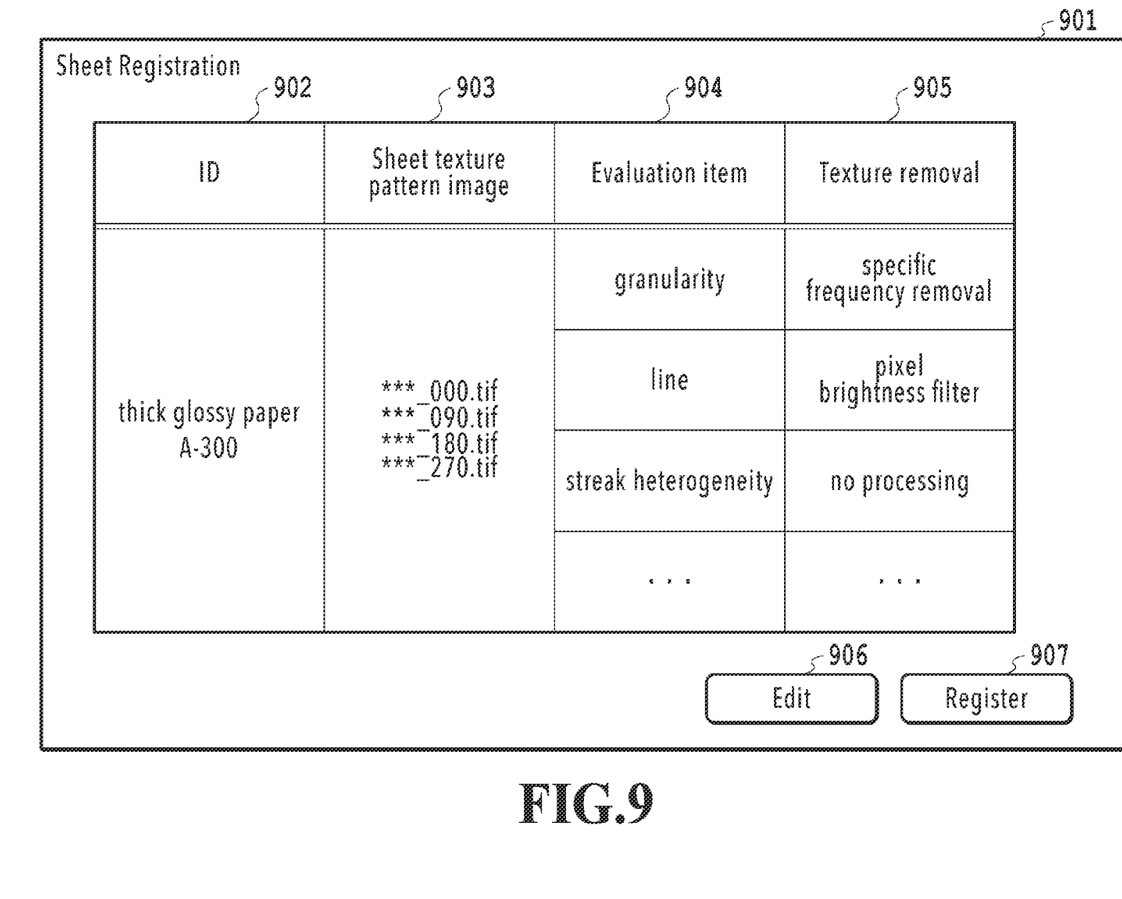
FIG. 9 is a diagram showing a UI screen example.

The registration method of the sheet data that is stored in the sheet data storage unit 802 is explained by using the drawing. FIG. 9 is a diagram showing a UI screen example on which to register the sheet data that is stored in the sheet data storage unit 802.

A UI screen 901 is a UI screen for registering the evaluation method (evaluation condition) in accordance with the sheet type as shown in FIG. 9. On the UI screen 901, as regards the sheet data that is stored in the sheet data storage unit 802, a list is shown including ID 902, Sheet texture pattern image 903, Evaluation item 904, and Texture removal 905. The UI screen 901 further has an Edit button 906 and a Register button 907. Because of this, on the UI screen 901, it is made possible to register the sheet data that is stored in the sheet data storage unit 802 in association with ID 902, Sheet texture pattern image 903, Evaluation item 904, and Texture removal 905.

ID 902 is an item that indicates the sheet type, for example, such as "thick glossy paper A-300". Sheet texture pattern image 903 includes the scanned images of the white paper area of the sheet stored in advance, for example, such as "*_000.tif", "*_090.tif", "*_180.tif", and "*_270.tif". In a case when the sheet texture pattern of the scanned image changes depending on the angle at which the sheet is arranged, it may also be possible to store a plurality of scanned images in accordance with the angles of arrangement.

Evaluation item 904 includes items, for example, such as "granularity", "line", and "streak heterogeneity". In Texture removal 905, for example, corresponding to "granularity", "specific frequency removal", corresponding to "line", "pixel brightness filter", and corresponding to "steak heterogeneity", "no processing" are set. That is, in Texture removal 905, the sheet texture pattern removal method corresponding to each evaluation item shown in Evaluation item 904 is set. Here, "specific frequency removal" indicates processing to decrease the texture influence of a printing medium by removing a specific frequency and "pixel brightness filter" is processing that uses a pixel brightness filter (for example, low-pass filter) and indicates processing to decrease the texture influence of a printing medium.

The Edit button 906 is a component for editing the contents of each of ID 902, Sheet texture pattern image 903, Evaluation item 904, and Texture removal 905 shown on the UI screen 901 for sheet registration.

The Register button 907 is component for registering the contents of each of ID 902, Sheet texture pattern image 903, Evaluation item 904, and Texture removal 905 shown on the UI screen 901 for sheet registration.

(Image Evaluation Processing)

Figure 10:
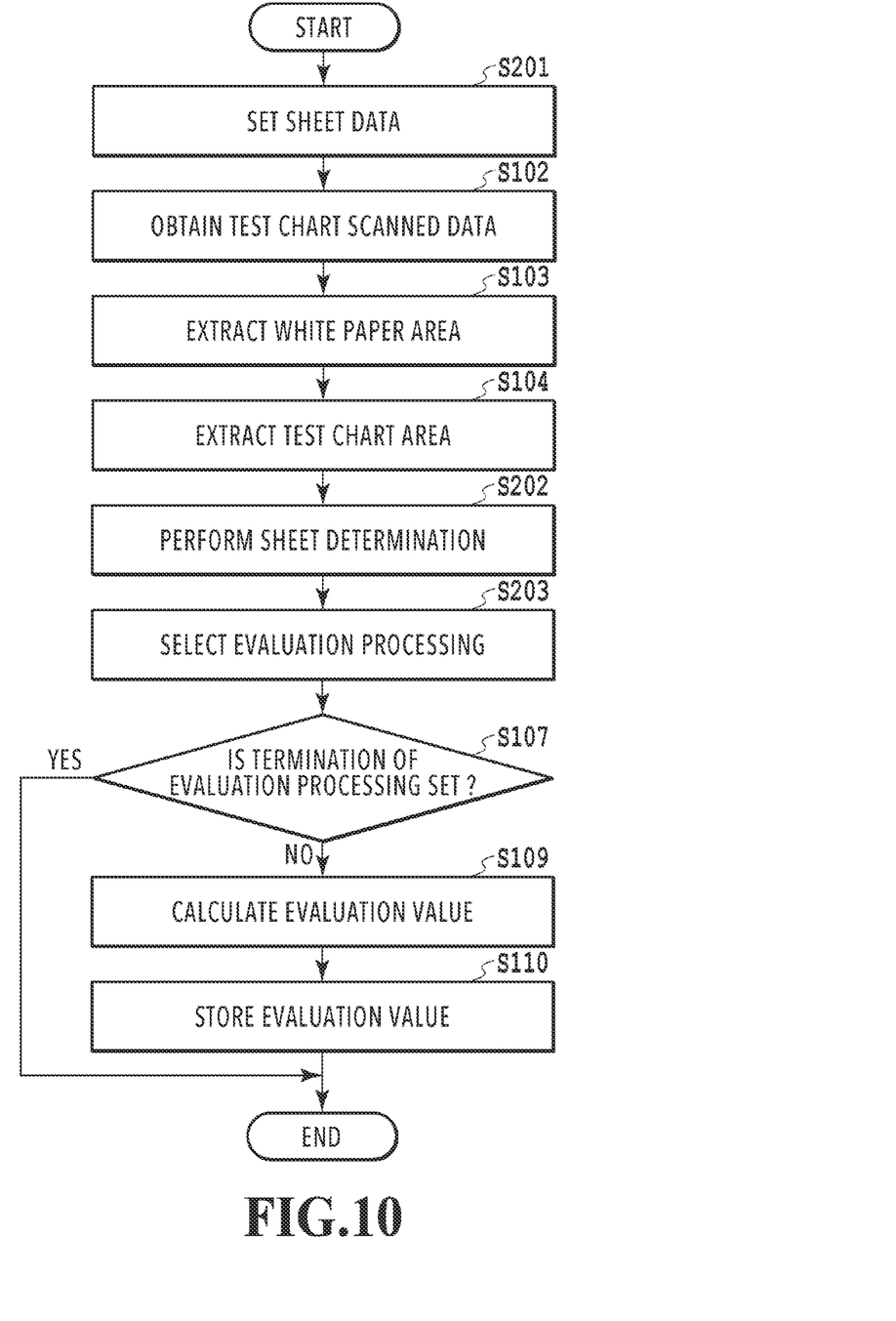
FIG. 10 is a flowchart showing a flow of image evaluation processing.

FIG. 10 is a flowchart showing a flow of image evaluation processing according to the present embodiment. The series of processing shown in the flowchart in FIG. 10 is performed by the CPU 101 loading a program code stored in the storage unit 103 onto the main memory 102 and executing the program code. Further, it may also be possible to implement part or all of the functions at the steps in FIG. 10 by hardware, such as an ASIC and an electronic circuit. The processing at S102 to S104 and the processing at S107, S109 and S110 are the same as those of the first embodiment, and, therefore, explanation is omitted and points different from the first embodiment are explained mainly and briefly.

At S201, the evaluation processing setting unit 208 sets sheet data and an evaluation method. The evaluation processing setting unit 208 sets, for example, the sheet data that is registered on the UI screen 901 shown in FIG. 9. Further, the evaluation processing setting unit 208 sets, for example, the evaluation method selected on the UI screen 301 as in the first embodiment.

At S202, the sheet determination unit 801 compares the white paper area of the sheet of the scanned image and the sheet data and based on the comparison results, and determines whether there is sheet data of the type that matches with the scanned image. Alternatively, the sheet determination unit 801 refers to the frequency analysis results of the scanned image of each sheet, and the like, and determines whether there is sheet data that matches with the scanned image. That is, this determination can also be said to determine the characteristic of the printing medium used for printing based on the image area corresponding to the margin area.

At S203, the evaluation processing setting unit 208 selects the texture removal processing that is set for the type of sheet data that matches with the scanned image and determines the evaluation method.

By the above, the processing of the flowchart shown in FIG. 10 is completed.

By performing the processing control explained above, it is possible to implement image quality evaluation of an image optimum for the characteristic of the sheet of a printed material and the purpose of observing the printed material. Specifically, it is possible to select the evaluation value calculation condition of a sheet with texture in accordance with sheet determination results, and, therefore, it is possible to implement image quality evaluation of an image optimum for the characteristic of the sheet and the purpose of observing the printed material. That is, it is possible to appropriately evaluate the image quality of a printed material in accordance with the type of printing medium used for printing.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., o central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™, a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present embodiment, it is possible to appropriately evaluate a printed material in accordance with the type of printing medium used for printing.

What is claimed is:

1. An image processing apparatus for evaluating a printed material, the image processing apparatus comprising:
    one or more processors functioning by executing instructions stored in one or more memories as the following units:
        an extraction unit configured to extract an image area corresponding to a margin area of a chart for the evaluation from a scanned image obtained by scanning a printed material on which the chart is printed; and
        an evaluation unit configured to evaluate the printed material based on, in a case when a printing medium used for the printing is determined to be a printing medium having a specific characteristic based on the image area corresponding to the margin area, the scanned image from which influence based on the specific characteristic is decreased.

2. The image processing apparatus according to claim 1, wherein the scanned image, from which the influence based on the specific characteristic is decreased, is a scanned image for which processing in accordance with contents with which the printed material is evaluated has been performed.

3. The image processing apparatus according to claim 2, wherein, in a case when the evaluation unit evaluates granularity of the printed material, the scanned image, from which the influence based on the specific characteristic is decreased, is a scanned image for which processing to decrease a specific frequency has been performed.

4. The image processing apparatus according to claim 2, wherein, in a case when the evaluation unit evaluates a line of the printed material, the scanned image, from which the influence based on the specific characteristic is decrease, is a scanned image for which processing using a pixel brightness filter has been performed.

5. The image processing apparatus according to claim 2, wherein the scanned image, from which the influence based on the specific characteristic is decreased, is a scanned image for which processing that is set in accordance with the type of printing medium has been performed.

6. The image processing apparatus according to claim 1, further comprising the following unit:
a determination unit configured to determine a characteristic of the printing medium used for the printing based on the image area corresponding to the margin area,
wherein the determination unit determines the characteristic of the printing medium used for the printing based on results of a comparison between analysis for the image area corresponding to the margin area and analysis for an image area corresponding to the chart in the scanned image.

7. The image processing apparatus according to claim 6, wherein the determination unit determines the characteristic of the printing medium used for the printing based on results of a comparison between a power spectrum obtained from the image area corresponding to the margin area and a power spectrum obtained from the image area corresponding to the chart.

8. The image processing apparatus according to claim 6, wherein the determination unit determines the characteristic of the printing medium used for the printing based on results of a comparison between an image of the image area corresponding to the margin area and an image of a printing medium having a prescribed characteristic on which the chart is not printed.

9. The image processing apparatus according to claim 1, further comprising the following unit:
a setting unit configured to set continuation of the evaluation or termination of the evaluation in a case when the characteristic of the printing medium used for the printing is the specific characteristic,
wherein the evaluation unit evaluates the printed material in accordance with setting by the setting unit.

10. The image processing apparatus according to claim 9, wherein the setting unit sets, in a case when continuation of the evaluation is set, evaluating the printed material based on the scanned image from which the influence based on the specific characteristic is decreased, or evaluating the printed material based on the scanned image from which the influence based on the specific characteristic is not decreased, and
the evaluation unit evaluates the printed material in accordance with the setting by the setting unit at the time of continuing the evaluation.

11. The image processing apparatus according to claim 1, wherein the specific characteristic is a periodic pattern that appears by three-dimensional concavities and convexities on a surface.

12. An image processing method for evaluating a printed material, the image processing method comprising:
an extraction step of extracting an image area corresponding to a margin area of a chart for the evaluation from a scanned image obtained by scanning a printed material on which the chart is printed; and
an evaluation step of evaluating the printed material based on, in a case when a printing medium used for the printing is determined to be a printing medium having a specific characteristic based on the image area corresponding to the margin area, the scanned image from which influence based on the specific characteristic is decreased.

13. A non-transitory computer readable storage medium storing a program for causing a computer to perform a control method of controlling an image processing apparatus for evaluating a printed material, the image processing apparatus comprising:
one or more processors functioning by executing instructions stored in one or more memories as the following units:
an extraction unit configured to extract an image area corresponding to a margin area of a chart for the evaluation from a scanned image obtained by scanning a printed material on which the chart is printed; and
an evaluation unit configured to evaluate the printed material based on, in a case when a printing medium used for the printing is determined to be a printing medium having a specific characteristic based on the image area corresponding to the margin area, the scanned image from which influence based on the specific characteristic is decreased.

* * * * *